(12) United States Patent
Kisielewicz

(10) Patent No.: US 9,401,807 B2
(45) Date of Patent: Jul. 26, 2016

(54) PROCESSING NON-EDITABLE FIELDS IN WEB PAGES

(75) Inventor: Marek Kisielewicz, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1141 days.

(21) Appl. No.: 13/020,547

(22) Filed: Feb. 3, 2011

(65) Prior Publication Data
US 2012/0201375 A1 Aug. 9, 2012

(51) Int. Cl.
*G06F 11/30* (2006.01)
*H04L 9/08* (2006.01)
*H04L 9/00* (2006.01)

(52) U.S. Cl.
CPC .................. *H04L 9/0891* (2013.01)

(58) Field of Classification Search
CPC .................................................. H04L 9/0891
USPC ........................................... 713/189; 380/30
See application file for complete search history.

(56) References Cited

U.S. PATENT DOCUMENTS

| | | | |
|---|---|---|---|
| 5,898,836 A | 4/1999 | Freivald et al. | |
| 6,105,012 A * | 8/2000 | Chang | G06Q 20/00 380/277 |
| 7,788,576 B1 * | 8/2010 | Chen | G06F 21/51 715/234 |
| 2001/0002472 A1 * | 5/2001 | Kanai | G06F 21/64 709/217 |
| 2002/0069204 A1 * | 6/2002 | Kahn et al. | 707/10 |
| 2002/0178187 A1 | 11/2002 | Rasmussen et al. | |
| 2003/0191737 A1 * | 10/2003 | Steele | G06F 17/30864 |
| 2004/0003248 A1 * | 1/2004 | Arkhipov | H04L 9/3247 713/170 |
| 2004/0039703 A1 | 2/2004 | Novoselsky et al. | |
| 2004/0167878 A1 * | 8/2004 | Doddington | G06Q 30/0603 |
| 2004/0186912 A1 * | 9/2004 | Harlow | G06Q 20/40 709/237 |
| 2005/0132020 A1 * | 6/2005 | Gorbet | G06F 21/10 709/217 |
| 2007/0168672 A1 | 7/2007 | Izu et al. | |
| 2007/0204043 A1 | 8/2007 | Espinosa et al. | |
| 2008/0072311 A1 | 3/2008 | Mullick et al. | |
| 2008/0175377 A1 * | 7/2008 | Merrill | G06F 21/36 380/30 |
| 2008/0184102 A1 * | 7/2008 | Selig | G06F 17/243 715/234 |
| 2009/0094456 A1 * | 4/2009 | Ruggiero et al. | 713/168 |
| 2009/0327411 A1 * | 12/2009 | Dang | H04L 63/123 709/203 |
| 2010/0037062 A1 * | 2/2010 | Carney | H04L 9/3247 713/176 |
| 2010/0258635 A1 * | 10/2010 | Jones | G06K 19/08 235/487 |
| 2012/0031969 A1 * | 2/2012 | Hammad | G06F 21/34 235/380 |
| 2012/0066380 A1 * | 3/2012 | Gao | G06F 17/3089 709/224 |

OTHER PUBLICATIONS

Author Unknown, Parameter Manipulation, Chapter 11. Preventing Common Problems, http://www.cgisecurity.com/owasp/html/ch11s04.html, printed Feb. 1, 2011.

* cited by examiner

*Primary Examiner* — Abu Sholeman

(74) *Attorney, Agent, or Firm* — International IP Law Group, PLLC

(57) ABSTRACT

A method of processing non-editable fields in a web page is provided herein. The method includes receiving a request comprising a submitted form of the web page. The request may include a target field value generated by a web server. The target field value may be non-editable on the web page. The method further includes determining that the web page comprises a hidden key associated with the target field value. Additionally, the method includes encrypting the target field value using an encryption key and a one-way encryption algorithm. The method also includes determining that the encrypted target field value matches the hidden key. Further, the method includes persisting the target field value.

20 Claims, 5 Drawing Sheets

100

200

300

PROCESSING NON-EDITABLE FIELDS IN WEB PAGES

BACKGROUND

Web pages sometimes include fields that are visible to a user, but not editable by the user. Instead, a server may make updates to the non-editable field, and display the update on the web page. In some cases, an update may be triggered by a change to another field on the same web page.

For example, a web page displaying mortgage information may display an interest rate and an amount of interest paid. However, the web page may allow the user to only update the interest rate, but not the amount of interest paid. Instead, the user may change the interest rate, and the server may, in response, update the amount of interest paid on the web page. In such cases, a malicious user may exploit the fact that the amount of interest paid may be changed by the server. By exploiting this fact, the malicious user may insert values that may otherwise be prohibited.

BRIEF DESCRIPTION OF THE DRAWINGS

Certain embodiments are described in the following detailed description and in reference to the drawings, in which.

DETAILED DESCRIPTION

In one approach, updates to non-editable fields may not be persisted into, for example, a database. While this approach may provide protection against the malicious user, other users may be deprived of useful data.

In another approach, copies of the updated values may be held in hash maps in memory on the server side. These hash maps may be attached to HTTP session objects for each user. By keeping copies of the updated values, the server may validate that the values received in the HTTP request are the same values produced by the server. However, this approach may consume large amount of memory, possibly leading to out of memory exceptions. Thus, these hash maps may, alternatively, be stored in temporary tables in the database. Unfortunately, this approach may affect the performance of the database.

Another approach involves re-generating the updated values on the server side after the updated web page is submitted in an HTTP request. As such, the server does not rely on the values sent in the HTTP request. However, in some cases, it may not be possible to regenerate the values.

In an example embodiment, updated values contained in the HTTP request may be verified using an encrypted key that is hidden on the updated web page. The server may validate the encrypted key in the HTTP request before persisting updated values into the database.

Figure 1:
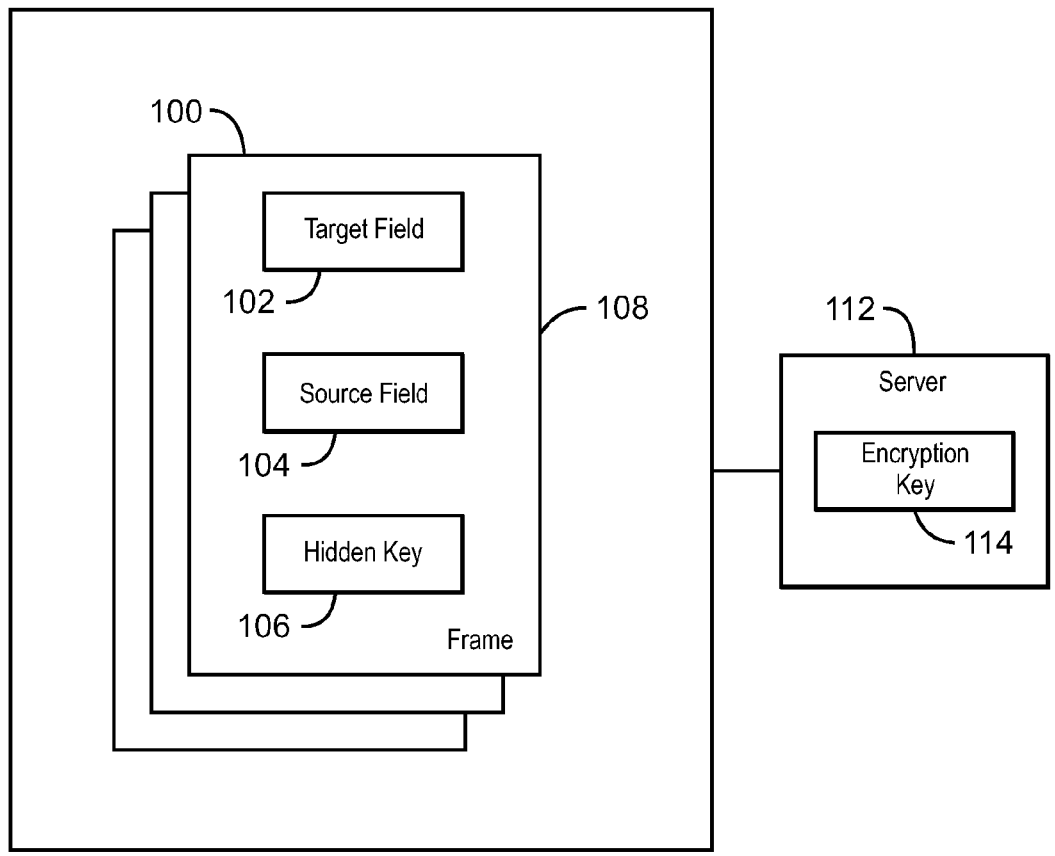
FIG. 1 is a block diagram of a web page in accordance with an embodiment.

FIG. 1 is a block diagram of a web page 100 in accordance with an embodiment. The web page 100 may be a dynamic web page, and may include a target field 102, a source field 104, and a hidden key 106. In some embodiments, the web page 100 may include a form that the user fills out.

The fields and key may be arranged in a frame 108. The web page 100 may be displayed on a client 110, connected to a server 112 over a network (not shown). The client 110 may be a browser running on a computer.

The target field 102 may be the field described above. In other words, the target field 102 may be visible to the user, but not editable.

As stated previously, the web page 100 may be dynamic, for example, changing content or layout according to certain parameters. The parameters may distinguish content or layout according to the time viewed, user preferences, user interactions, etc.

In various embodiments, the target field 102 may be updated by the server 112 in response to a change to another field on the web page. For example, changes to the source field 104 may trigger an update of the target field 102.

In some embodiments, updates to the target field 102 may be based on rules executed on the server 112. These rules may be executed by a rules engine in response to a change to the source field 104. The rules engine may be a component of the server 112 that evaluates rules configured by an administrator. The rules may use values of the source field 104, and data from a database or retrieved from external system, to calculate results. The rules may include SQL queries and invocations of internal or external methods. These results may be sent back to the client 110 for display as the target fields 102.

In such embodiments, the server 112 may send the updated value to the browser for display in the web page 100. The server 112 may also encrypt the updated value with a unique encryption key 114 generated for each user session. The encryption may be a one-way encryption, meaning the encrypted value is not configured to be decrypted. The encryption key 114 may be stored securely on the server 112.

The encrypted value may also be sent to the browser. In some embodiments, the encrypted value may be dynamically injected to an HTML form on the web page 100. The hidden key 106, which is not displayed, may contain the encrypted value.

The user may make other changes to other fields until the web page 100 is submitted, for example, by clicking on a "submit" button. When the web page 100 is submitted, the target field 102, the source field 104, and the hidden key 106 may be sent back to the server 112. The server 112 may use the encryption key 114 to re-encrypt the submitted value of the target field 102. The server 112 may compare the re-encrypted value with the value from the hidden key 106 to determine if the target field 102 has been altered outside of server 112. If the values are the same, the web page 100 may be processed accordingly. If the values are different, an error message may be sent to the client 110.

In this manner, the server 112 may determine if the value originally generated by a rule engine on the server 112 and sent to the web browser has been altered. If the target field value has been altered, it may be rejected and not further processed. If the target field value is unchanged, the value may be further processed, even potentially stored in a database.

In some embodiments, the web page may include multiple target fields 102, source fields 104, and hidden keys 106. The relationships described above may include associations between one, or many, of the target fields 102, source fields 104, and hidden keys 106. For example, a change to one source field 104 may update the value of multiple target fields 104 and associated hidden keys 106.

Figure 2:
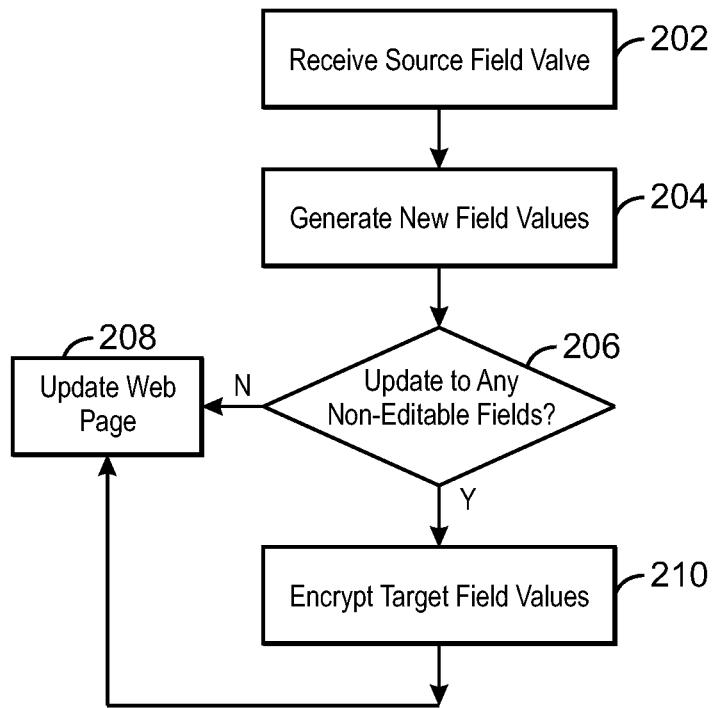
FIG. 2 is a process flow diagram of a method for processing non-editable fields in a web page in accordance with an embodiment.

FIG. 2 is a process flow diagram of a method 200 for processing non-editable fields in the web page 100 in accordance with an embodiment. It should be understood that the process flow diagram is not intended to indicate a particular order of execution. The method 200 may be performed by the server 112 each time the source field 104 is changed.

The method 200 begins at block 202, where the server 112 may receive an updated source field value. In some embodiments, the browser may detect that a field on the web page is changed. For example, a field change event is triggered in response to a change to the source field 104. When the field change event is triggered, the browser may submit a request for the server 112 to update the value of the target field 102. The request may include the new value of the updated source field 104. In some embodiments, the frame 108 containing the source field 104 may be submitted to the server 112.

At block 204, the server 112 may generate new values for fields on the web page 100 affected by the change to the source field 104. In response to receiving the frame 108, the server 112 may trigger rules that generate a new value for the target field 102. The rules may also generate new values for other fields on the web page 100 that are affected by the change to the source field 104. In some cases, these other fields may be editable.

At block 206, the server 112 may check whether any of the affected fields are non-editable for the current user. If not, at block 208, the server 112 may update the web page 100 according to the new values. In some embodiments, the server 112 may generate a java script to update the affected fields in the web page 100.

If there are any non-editable fields in the result set, such as the target field 102, at block 210, the server 208 may encrypt the new target field value using one-way encryption, such as a one-way hashing function. The server 112 may retrieve the encryption key 114 from a current user session. Alternatively, the server 112 may generate the encryption key 114 if it does not yet exist. As stated previously, the web page 100 may include multiple target fields 102. In such cases, the value of each target field 102 may be encrypted using the encryption key 114.

At block 208, the web page 100 may be updated with the new values for the target fields 102. The web page 100 may also be updated with the associated encrypted values. In some embodiments, the encrypted values may be passed as a base64 encoded argument to the java script function, executed on the client 110. The java script function may inject an additional hidden parameter associated with the encrypted value. The additional hidden parameter may reference the corresponding target field 102. In cases where the same rule is triggered multiple times on the server 112, the hidden parameters may be updated multiple times.

As stated previously, the method 200 may be performed each time the source field 104 is changed. When the web page 100 is submitted for processing, a method 300 may be performed that validates the new target field values before processing further.

Figure 3:
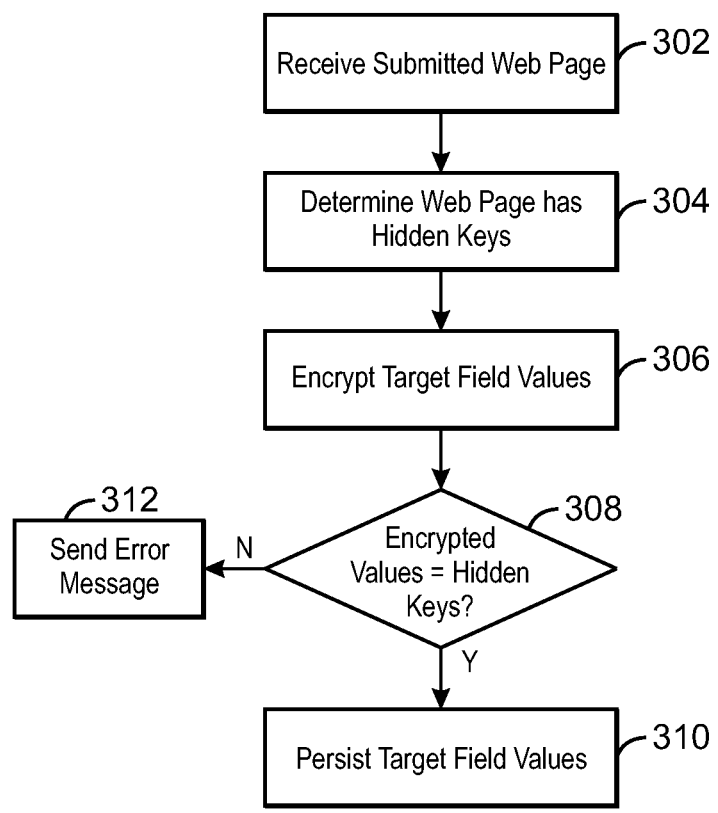
FIG. 3 is a process flow diagram of a method for processing non-editable fields in a web page in accordance with an embodiment.

FIG. 3 is a process flow diagram of the method 300 for processing non-editable fields on the web page 100 in accordance with an embodiment. It should be understood that the process flow diagram is not intended to indicate a particular order of execution. The method 300 may be performed by the server 112.

The method 300 begins at block 302, where the submitted web page 100 may be received. In embodiments, when the user submits the entire form to the server 112, all fields, including the target fields 102, source fields 104, and hidden keys 106, may be sent as parameters in an HTTP request.

At block 304, the server 112 may determine that the web page 100 contains hidden keys 106 associated with the target fields 102. In some embodiments, an update controller may retrieve all parameters from the HTTP request that are to be persisted by the server 112. For example, the new target field values may be saved in corresponding fields on a database.

The update controller may be a component of the server 112. The update controller may retrieve parameters from an HTTP request and validate the parameters. The update controller may also determine if any of the parameters is changed, and needs to be persisted. The update controller may check the privileges of a user associated with the current session to determine if the user has the rights to modify the values of all parameters submitted in the request. If the request contains parameters which are non-editable by the current user, the update controller may determine if these parameters have corresponding hidden encrypted fields and proceed as described above.

The update controller may persist the data in the database or invoke an internal or external process for further processing of the user request. The update controller may render a new content of the page and return it back to the browser or redirect the browser to a new page.

For each target field 102, the controller may look for a corresponding hidden parameter that contains the encrypted, base64 encoded value. If no hidden parameter is found in the HTTP request, no further processing may take place. As such, updates to target field values may not be persisted. The encrypted hidden fields may be used only for non-editable parameters included in the submitted HTTP request.

At block 306, the update controller may encrypt the value of the target field 102 with the encryption key 114. At block 308, the update controller may determine whether the newly-generated encrypted values match the values of the corresponding hidden keys 106. If values match, this may mean that the target field values are unaltered since being generated by the rule engine. As such, at block 310, the target field value received in the request may be persisted by the server 112. For example, the target field values may be stored in a database, or used for some further processing of the submitted web page. If the encrypted values do not match, at block 312 an error message may be sent to the client 110.

Advantageously, a server side rule engine may bypass field level security of the target fields 102 without making these fields vulnerable for attacks where their values are updated directly. Embodiments only use enough additional memory to store the encryption keys 114 on the session object. Further, verification of updated values to the target field 102 may take place by only triggering the rules one time. Further, any data persisted by the server 112 contains the same values as presented to the user.

Figure 4:
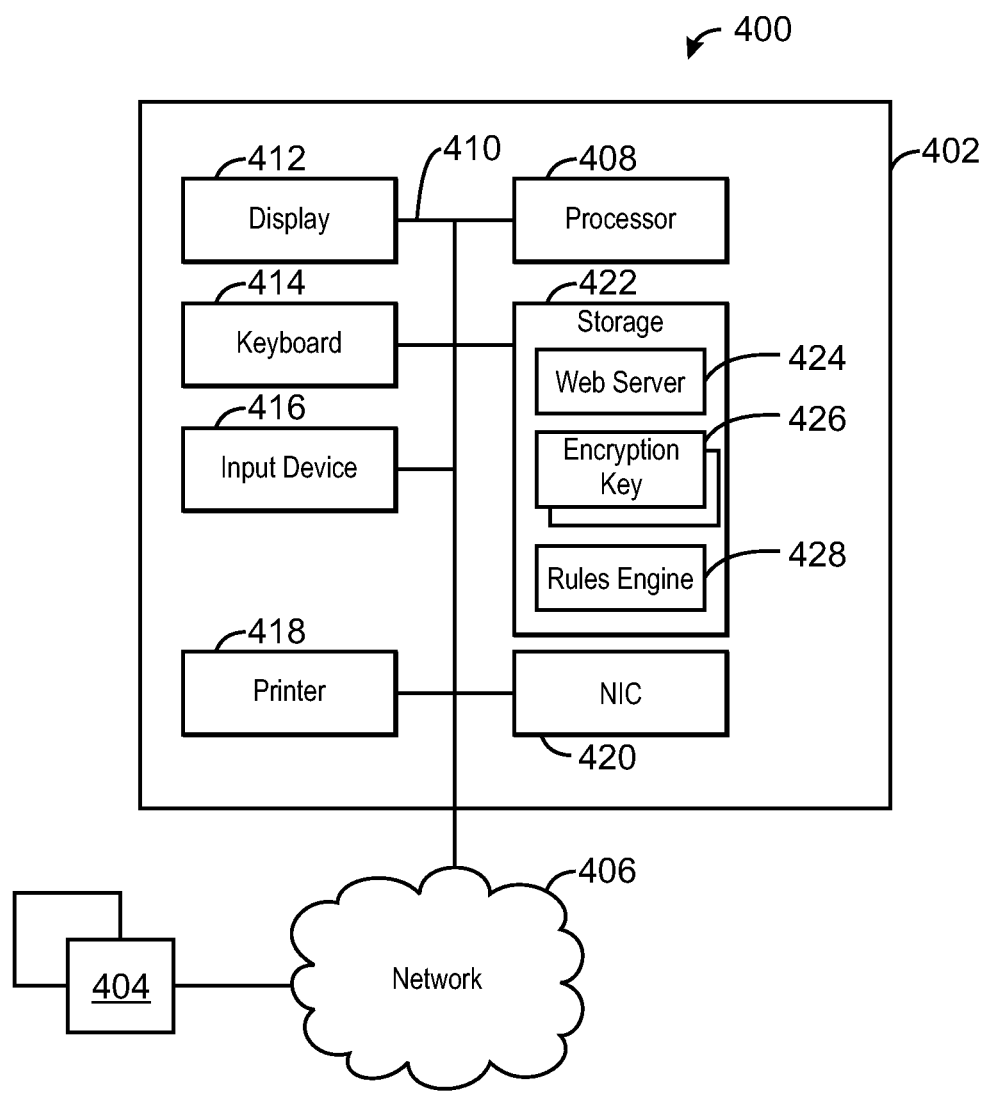
FIG. 4 is a block diagram of a system for processing non-editable fields in a web page in accordance with an embodiment.

FIG. 4 is a block diagram of a system for processing non-editable fields on the web page 100 in accordance with an embodiment. The system is generally referred to by the reference number 400.

The functional blocks and devices shown in FIG. 4 may comprise hardware elements, software elements, or some combination of software and hardware. The hardware elements may include circuitry. The software elements may include computer code stored on a non-transitory, computer-readable medium. Additionally, the functional blocks and devices of the system 400 are but one example of functional blocks and devices that may be implemented in an embodiment. Specific functional blocks may be defined based on design considerations for a particular electronic device.

The system 400 may include a server 402 and a client 404, in communication over a network 406. The client 404 may be similarly configured to the server 402. For example, the server 402 may include a processor 408, which may be connected through a bus 410 to a display 412, a keyboard 414, an input device 416, and an output device, such as a printer 418. The input devices 416 may include devices such as a mouse or touch screen. The server 402 may also be connected through the bus 410 to a network interface card 420. The network interface card 420 may connect the server 402 to the network 406.

The network 406 may be a local area network, a wide area network, such as the Internet, or another network configuration. The network 406 may include routers, switches, modems, or any other kind of interface device used for interconnection. In one example embodiment, the network 406 may be the Internet.

The server 402 may have other units operatively coupled to the processor 412 through the bus 410. These units may include non-transitory, computer-readable storage media, such as storage 422. The storage 422 may include media for the long-term storage of operating software and data, such as hard drives. The storage 422 may also include other types of non-transitory, computer-readable media, such as read-only memory and random access memory.

The storage 422 may include the machine readable instructions used in embodiments of the present techniques. In an embodiment, the storage 422 may include a web server 424, a rules engine 428, and encryption keys 426. The web server 424 may provide a web page 100 with the content and layout described above. The web server 424 may also encrypt updated target field values using the encryption keys 426 as described above. The rules engine 428 may execute rules for updating the target field values in response to changes to the source fields 104.

Figure 5:
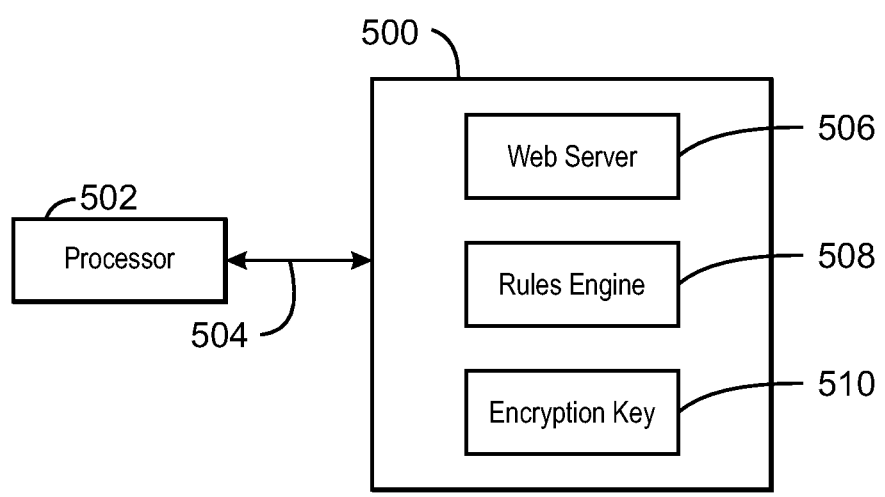
FIG. 5 is a block diagram showing a non-transitory, computer-readable medium that stores code for processing non-editable fields in a web page in accordance with an embodiment.

FIG. 5 is a block diagram of a non-transitory, computer-readable medium that stores code adapted to generate test data according to an example embodiment. The non-transitory, computer-readable medium is generally referred to by the reference number 500.

The non-transitory, computer-readable medium 500 may correspond to any typical storage device that stores computer-implemented instructions, such as programming code or the like. For example, the storage device may include a hard disk drive, a magnetic disk drive, e.g., to read from or write to a removable magnetic disk, and an optical disk drive, e.g., for reading a CD-ROM disk or to read from or write to other optical media. Further, other types of media that are readable by a computer system and that are suitable to the desired end purpose may be used, such as magnetic cassettes, flash memory cards, digital video disks, Bernoulli cartridges, and the like.

The storage device may be connected to a system bus by a storage device interface, such as a hard disk drive interface, a magnetic disk drive interface and an optical drive interface. For example, the storage device may be the storage 422 discussed with respect to FIG. 4.

When read and executed by a processor 502 via a communication path 504, the instructions stored on the non-transitory, computer-readable medium 500 are adapted to cause the processor 502 to process non-editable fields on the web page 100 according to an example embodiment, as described herein.

A web server 506 may receive a source field value that has been changed on the web page 100. A rules engine 508 may generate new values for associated target fields on the web page 100. The web server 506 may encrypt the new target field values with an encryption key 510. The web server 506 may also send updates for the web page to a client. The updates may include the new target field values and the encrypted values.

The web server 506 may also receive the web page 100 once submitted by the user. The web server 506 may determine that the web page 100 contains hidden keys 106. The web server 506 may encrypt the target field values using the encryption keys 510. If the encrypted values match the values of the hidden keys 106, the target field values may be persisted into a database.

What is claimed is:

1. A method of processing non-editable fields in a web page, comprising:
receiving a request comprising a submitted form of the web page, wherein the request comprises a target field value generated by a web server, and wherein the target field value is non-editable on the web page and wherein the target field value is associated with a hidden key included in the web page;
encrypting the target field value using an encryption key and a one-way encryption algorithm; and
persisting the target field value only upon a determination that the encrypted target field value matches the hidden key.

2. The method recited in claim 1, wherein persisting the target field value comprises storing the target field value in a database.

3. The method recited in claim 1, wherein the request comprises a hypertext transfer protocol request.

4. The method recited in claim 1, comprising:
receiving an initial request comprising a source field value associated with the target field value, wherein the web page comprises the source field value;
generating the target field value based on the source field value;
generating an encrypted target field value using the target field value and the encryption key; and
updating the web page dynamically using the target field value and the encrypted target field value.

5. The method recited in claim 4, wherein updating the web page dynamically comprises executing a script that dynamically injects the target field value and the encrypted target field value into the web page.

6. The method recited in claim 4, wherein the web server comprises a rules engine, and wherein the rules engine generates the target field value based on rules specified for the source field value.

7. The method recited in claim 4, comprising triggering a field change event in response to a change to the source field value, wherein the field change event is configured to generate the initial request.

8. The method recited in claim 4, comprising sending the initial request to the web server.

9. A computer system for processing non-editable fields in a web page, comprising:
a memory storing instructions;
a processor configured to execute the instructions to:
receive a request comprising a submitted form of the web page, wherein the request comprises a target field value generated by a web server, and wherein the target field value is non-editable on the web page;

determine that the web page comprises a hidden key associated with the target field value;
encrypt the target field value using an encryption key and a one-way encryption algorithm;
determine that the encrypted target field value matches the hidden key; and
persist the target field value.

10. The computer system recited in claim 9, wherein the target field value is persisted by storing the target field value in a database.

11. The computer system recited in claim 9, wherein the request comprises a hypertext transfer protocol request.

12. The computer system recited in claim 9, wherein the processor is configured to:
receive an initial request comprising a source field value associated with the target field value, wherein the web page comprises the source field value;
generate the target field value based on the source field value;
generate an encrypted target field value using the target field value, the encryption key, and the one-way encryption algorithm; and
update the web page dynamically using the target field value and the encrypted target field value.

13. The computer system recited in claim 12, wherein the web page is dynamically updated by a java script executed to dynamically inject the target field value and the encrypted target field value into the web page.

14. The computer system recited in claim 12, wherein the web server comprises a rules engine, and wherein the rules engine generates the target field value based on rules specified for the source field value.

15. The computer system recited in claim 12, wherein the processor is configured to:
trigger a field change event in response to a change to the source field value, wherein the field change event is configured to generate the initial request; and
send the initial request to the web server.

16. A non-transitory, computer-readable medium comprising machine-readable instructions executable by a processor to process non-editable fields in a web page, wherein the machine-readable instructions, when executed by the processor, cause the processor to:
receive a first request comprising a source field value associated with a target field value, wherein the web page comprises the source field value and the target field value;
generate the target field value based on the source field value;
generate a first encrypted target field value using the target field value, an encryption key, and a one-way encryption algorithm;
update the web page dynamically using the target field value and the first encrypted target field value, wherein the target field value is non-editable, and the first encrypted target field value is not visible;
receive a second request comprising a submitted form of the web page;
determine that the web page comprises the first encrypted target field value;
generate a second encrypted target field value using the target field value the encryption key, and the one-way encryption algorithm;
determine that the first encrypted target field value matches the second encrypted target field value; and
persist the target field value.

17. The non-transitory, computer-readable medium recited in claim 16, comprising machine-readable instructions which, when executed by the processor, cause the processor to persist the target field value by storing the target field value in a database.

18. The non-transitory, computer-readable medium recited in claim 16, wherein the web page is dynamically updated by a Java script executed to dynamically inject the target field value and the first encrypted target field value into the web page.

19. The non-transitory, computer-readable medium recited in claim 16, wherein the web server comprises a rules engine, and wherein the rules engine generates the target field value based on rules specified for the source field value.

20. The non-transitory, computer-readable medium recited in claim 16, comprising machine-readable instructions which, when executed by the processor, cause the processor to:
trigger a field change event in response to a change to the source field value, wherein the field change event is configured to generate the initial request; and
send the initial request to the web server.

* * * * *